J. H. GASSAWAY.
AUTOMATIC RAT TRAP.
APPLICATION FILED APR. 7, 1915.
1,162,599.
Patented Nov. 30, 1915.
4 SHEETS—SHEET 1.
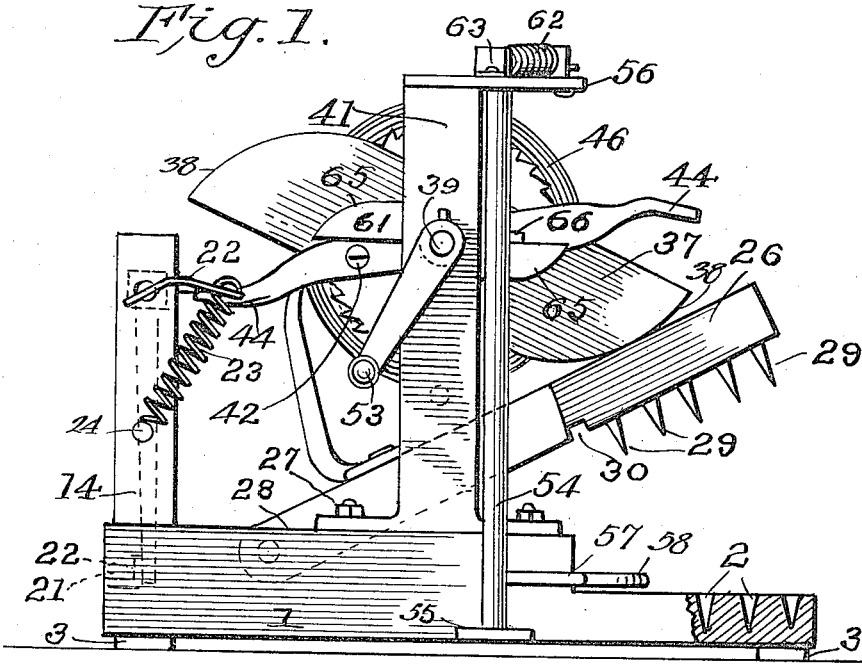
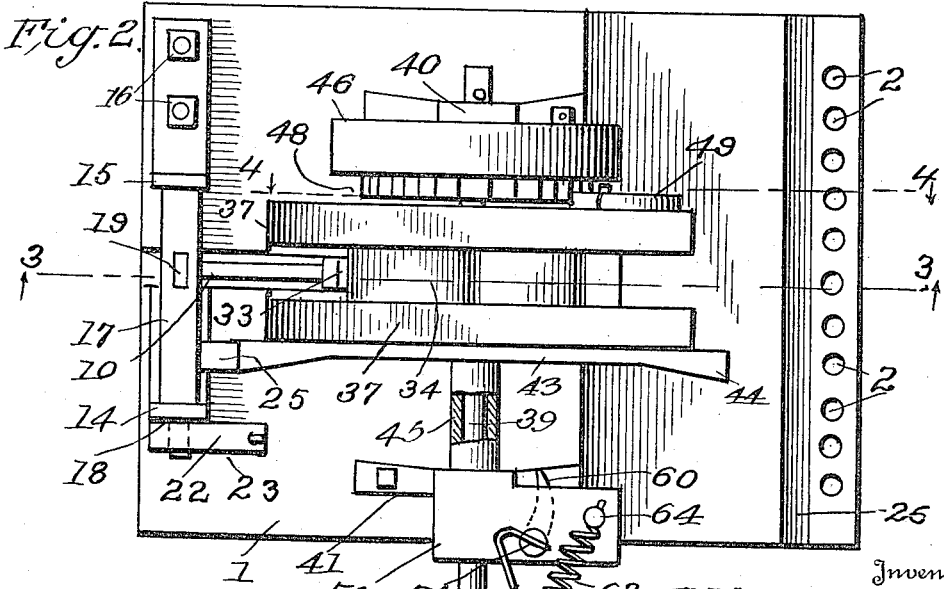
Witnesses
J. A. Ryan
Inventor
J. H. Gassaway
By
Attorney

J. H. GASSAWAY.
AUTOMATIC RAT TRAP.
APPLICATION FILED APR. 7, 1915.

1,162,599.

Patented Nov. 30, 1915.
4 SHEETS—SHEET 2.

Witnesses
J. A. Ryan

Inventor
J. H. Gassaway
By
Attorney

J. H. GASSAWAY.
AUTOMATIC RAT TRAP.
APPLICATION FILED APR. 7, 1915.
1,162,599.
Patented Nov. 30, 1915.
4 SHEETS—SHEET 3.
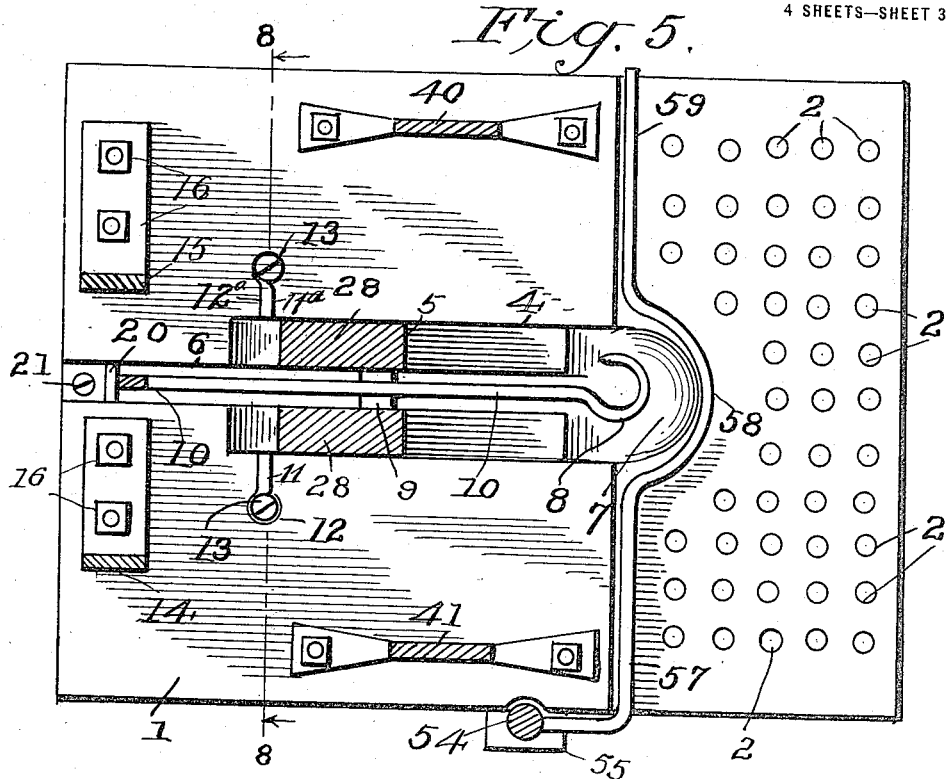
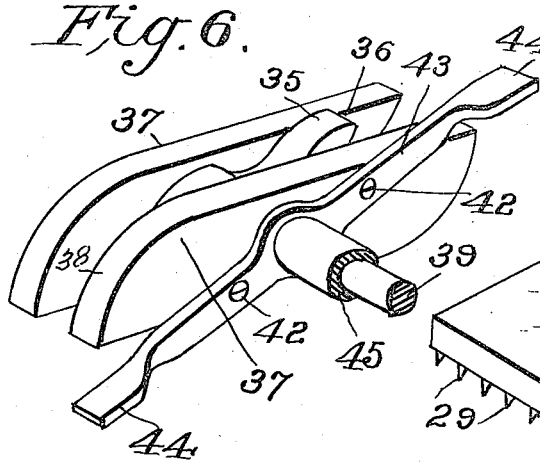
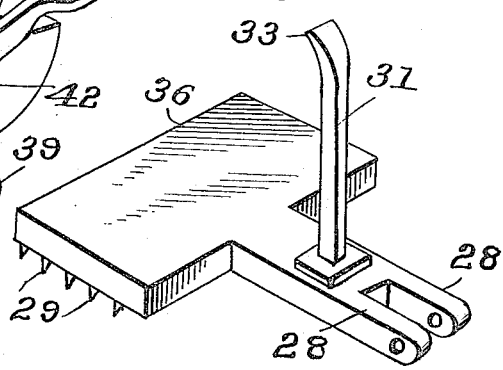
Witnesses
J. A. Ryan
Inventor
J. H. Gassaway
By
Attorney

J. H. GASSAWAY.
AUTOMATIC RAT TRAP.
APPLICATION FILED APR. 7, 1915.

1,162,599.

Patented Nov. 30, 1915.
4 SHEETS—SHEET 4.

Witnesses
J. A. Ryan

Inventor
J. H. Gassaway

UNITED STATES PATENT OFFICE.

JOHN H. GASSAWAY, OF HAWORTH, OKLAHOMA, ASSIGNOR OF ONE-HALF TO SMITH HURST, OF HAWORTH, OKLAHOMA.

AUTOMATIC RAT-TRAP.

1,162,599.  Specification of Letters Patent.  Patented Nov. 30, 1915.

Application filed April 7, 1915.  Serial No. 19,777.

*To all whom it may concern:*

Be it known that I, JOHN H. GASSAWAY, a citizen of the United States, residing at Haworth, in the county of McCurtain and State of Oklahoma, have invented certain new and useful Improvements in Automatic Rat-Traps; and I do hereby declare the following to be a full, clear, and exact description of the invention, such as will enable others skilled in the art to which it appertains to make and use the same.

This invention relates to automatic rat traps, and the principal object of the invention is to provide a rat trap which will operate efficiently to catch and kill a rat, to reset the trap, and to eject the rat previously killed and leave the trap in condition to catch and kill another rat and eject him after the trap has been reset and to operate in this way continuously as long as the spring power is exerted on the resetting shaft.

The foregoing and other objects may be attained by means of the construction illustrated in the accompanying drawings, in which—

Figure 3:
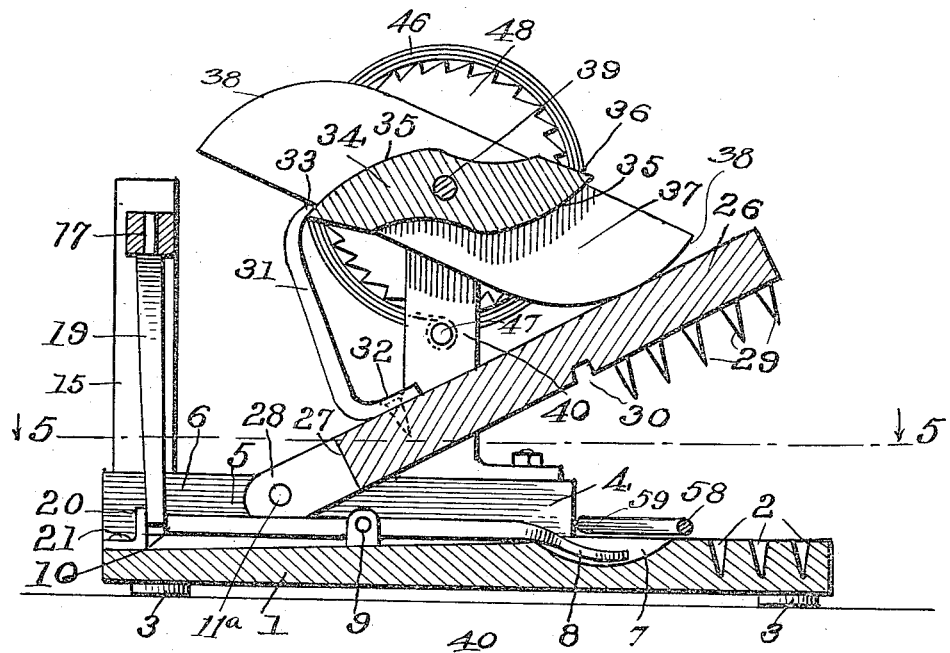
Figure 4:
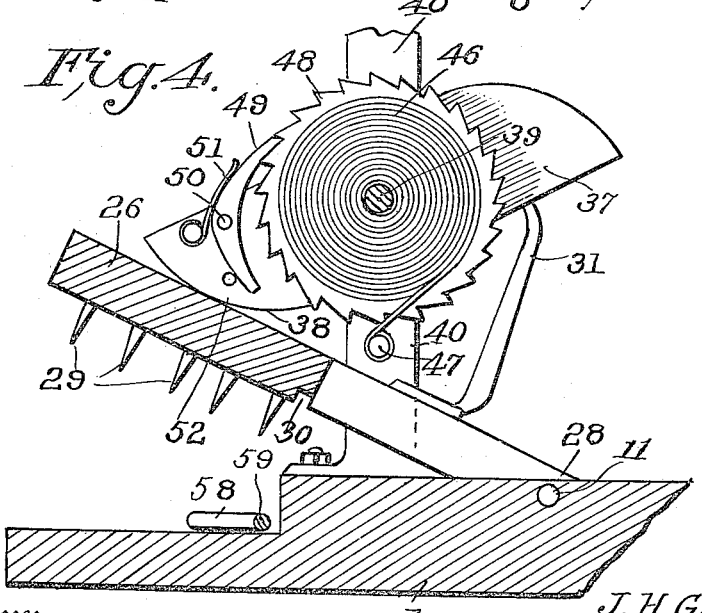
Figure 8:
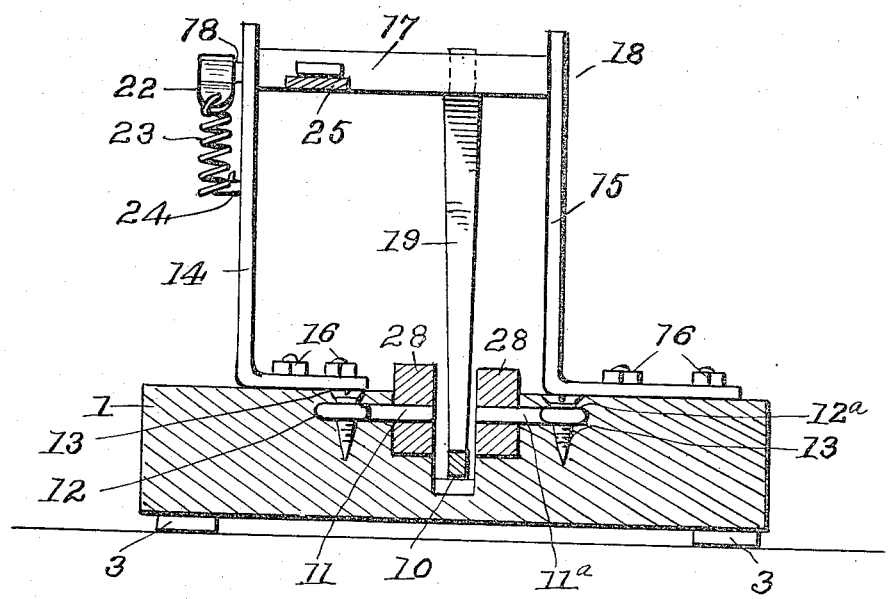
Figure 9:
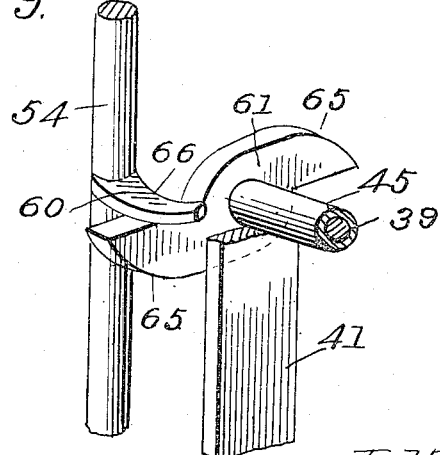

Figure 1 is a side elevation and partial section of an automatic rat trap made in accordance with this invention, the trap being shown in set condition, Fig. 2 is a top plan view of the same, Fig. 3 is a vertical sectional view taken on the line 3—3 of Fig. 2 looking in the direction indicated by the arrows, Fig. 4 is a vertical sectional view taken on the line 4—4 of Fig. 2 looking in the direction indicated by the arrows, Fig. 5 is a horizontal sectional plan view taken on the line 5—5 of Fig. 3, looking in the direction indicated by the arrows, Fig. 6 is a detail perspective view of the double cam connected to the spring actuated shaft for springing the trap and for setting the same, Fig. 7 is a detail perspective view of the movable jaw of the trap, Fig. 8 is a vertical sectional view taken on the line 8—8 of Fig. 5, looking in the direction indicated by the arrow, and Fig. 9 is a detail perspective view of the cam and the ejector shaft with certain parts broken away.

Referring to the drawings, the numeral 1 designates the base of the trap, which is substantially rectangular when viewed in plan and the front portion of said base is cut away or reduced in thickness and provided with a series of tapering sockets 2. The base is provided with a recess 4 which extends to the shoulder 5 and intermediate the side walls of the recess 4 is a narrower recess or slot 6 extending through the back of the base 1. The base is provided with a concavity 7 in the reduced front portion, and a bait holder in the form of a hook 8 is disposed in the concavity 7, said bait holder being pivoted at 9 within the recess 4 and having its rear end 10 extended into the narrower recess or slot 6 to form a trigger. The pivot on which the movable jaw is pivoted consists of pintles 11 and 11$^a$ having eyes 12, 12$^a$ at the ends thereof, said eyes being secured by means of countersunk screws 13 to the base 1, as shown more clearly in Fig. 8.

Supported at the rear portion of the base 1 are vertical bracket members 14 and 15, said brackets being connected by screws or bolts 16 to said base. A cross bar 17 having reduced ends 18 pivoted in the brackets 14 and 15 has connected thereto a depending finger 19, the lower end of said finger projecting into the reduced recess or slot 6 in the base, adjacent to the trigger 10. An L-shaped stop 20 is provided with a slot and an adjusting screw 21 by means of which said stop may be adjusted against the lower end of the finger 19 to limit the movement of the finger 19 away from the rear end of the trigger 10. One of the reduced ends 18 of the cross bar 17 is extended beyond the bracket 14 and connected to said reduced end is an arm 22. A spring 23 is connected to the arm 22 at one end and the opposite end being connected to a stud 24 on the bracket 14, the spring serving to throw the finger 19 away from the end of the trigger 10. Projecting horizontally from the cross bar 7 is a stop 25.

The movable jaw 26 of the trap is provided with a reduced rear end 27 which is provided with spaced members 28 pivoted on the pintle 11. The jaw member 26 is provided with a plurality of tapering prongs or pins 29, which are somewhat smaller in diameter than the sockets 2 in the base, and said movable jaw is provided with a recess 30 to receive the ejector 57 and its horizontal extension 59 when the jaw is closed. A curved arm 31 is secured to the upper face of the jaw 26 by means of a screw 32, said arm having a projecting end 33 which engages a compound detent 34.

The detent 34 is provided with two oppositely curved portions 35, each having a projecting point 36 to be engaged by the projecting end 33 of the arm 31. The detent 34 is disposed intermediately of the double cam members 37, said cam members each having a curved surface 38. The cams 37 and the detents 34 are mounted upon a shaft 39 journaled in brackets 40 and 41 projecting upward from the base 1. Connected to one of the cams 37, by means of screws 42 is an escapement member 43 provided with flattened ends 44 which engage the stop 25 on the cross bar 17. Formed on the escapement element 43 is a tubular nipple 45 mounted loosely upon the shaft 39.

A convolute spring 46 is connected at one end to the shaft 39, and the opposite end is connected to a pin 47 projecting from the bracket 40. A ratchet wheel 48 is fixed to the shaft 39, and a pawl 49 is pivoted at 50 to one of the cams 37 and provided with a spring 51 which holds the nose of the pawl in connection with the teeth of the ratchet wheel 48, the opposite end of said pawl being provided with a stop pin 52 connected to the cam 37.

The sleeve portion 45 is mounted in the bracket 41 and the shaft 39 is mounted to turn therein, and at the outer end of said shaft is a crank 53 which may be operated to wind the spring. A vertical shaft 54 mounted at its lower end rotatably in a plate 55, at its upper end is mounted in a bearing plate 56 secured to the upper end of the bracket 41. Connected near the lower end of the shaft 54 is an ejector 57, said ejector being extended through an aperture in the vertical shaft 54 and provided with a curved portion 58 which normally extends around a bait hook 8, and has a horizontal extension 59. On the shaft 54 is a finger or projection 60. The finger 60 is held in the path of the cam 61 by means of a helical spring 62 connected at one end to an arm 63. The arm 63 is connected to the upper end of the shaft 54, and the opposite end of the spring 62 is connected to a stud 64 projecting upward from the plate 56. The double cam 61 is provided with oppositely curved surfaces 65 which come into contact twice during each revolution with the curved portion 66 of the finger 60 to operate the ejector 57.

The operation of the invention may be briefly described as follows: When the spring 46 is wound up by means of the crank 53, and the pivoted jaw 26 is raised to the position shown in Fig. 1 of the drawing, the combined bait hook and trigger is in the position shown in Fig. 1 with the rear end 10 in contact with the vertical finger 19 at its lower end. When the animal pulls upward on the bait hook 8, the rear end 10 of the trigger is depressed beyond the lower end of the finger 19, then the flat portion 44 of the escapement will pass the stop 25 on the cross bar 17 and thus permit the spring 46 to actuate the cams 37 whereby the smooth surface 38 of said cam coming in contact with the movable jaw 26 will force said jaw downwardly with force strong enough to catch an animal. A further rotation of the cam will raise the jaw 26 and operate the ejector 57 to throw out the animal caught and reset the trap.

From the foregoing it will be obvious that after the spring has been wound, the trap is automatic and will catch, kill, and eject rats and reset the trap continuously as long as the spring is in tension.

Various changes may be made in the details of construction without departing from the spirit and scope of the invention as defined in the claims.

What is claimed is:—

1. In a trap of the character described, a base, a jaw member pivoted to the base, a bait holder and trigger pivoted to the base, a pivoted cross bar, a finger mounted on said pivoted cross bar and adapted to contact with the rear end of the trigger, a horizontal shaft, a spring on said shaft, means for winding up the spring, cams on the shaft, an escapement on the shaft, a stop on the cross bar carrying the finger, and means whereby when the bait holder is tampered with, the trigger is released from contact with the finger and the pivoted jaw of the trap is closed and opened, and means for ejecting the animal and leaving the trap reset for another victim.

2. An automatic trap comprising a base, a jaw pivoted to the base, uprights connected to the base, a shaft mounted in said uprights, a spring on said shaft, a ratchet wheel on said shaft, cams on said shaft, a pawl connected to said cams, and adapted to engage the ratchet teeth, an escapement device, a stop, a cross bar on which said stop is mounted, a finger connected to said cross bar, a trigger pivoted in the base, and having a bait holder at its end, said finger adapted to contact with the rear end of the trigger, a finger on the pivoted jaw engaging a curved end connected to the cam and means for ejecting the animal after each operation of the pivoted jaw.

In testimony whereof I affix my signature in presence of two witnesses.

JOHN H. GASSAWAY.

Witnesses:
D. C. MYERS,
E. M. WOODS.